United States Patent
Choi et al.

(10) Patent No.: US 7,889,518 B2
(45) Date of Patent: Feb. 15, 2011

(54) HALF-BRIDGE POWER CONVERTER SYSTEM AND METHOD OF OPERATION

(75) Inventors: Hang-Seok Choi, Gunpo (KR); Han-Suk Seo, Seoul (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 624 days.

(21) Appl. No.: 11/796,332

(22) Filed: Apr. 27, 2007

(65) Prior Publication Data
US 2007/0268729 A1    Nov. 22, 2007

(30) Foreign Application Priority Data
May 16, 2006    (KR)    ........................ 10-2006-0043765

(51) Int. Cl.
*H02M 7/538* (2007.01)
(52) U.S. Cl. .......................................... 363/17; 363/132
(58) Field of Classification Search ............. 363/21.01, 363/21.02, 49, 97, 131, 132, 17, 98
See application file for complete search history.

(56) References Cited

U.S. PATENT DOCUMENTS

| | | | |
|---|---|---|---|
| 5,999,433 A * | 12/1999 | Hua et al. ..................... | 363/132 |
| 6,320,763 B2 * | 11/2001 | Hosotani ...................... | 363/16 |
| 6,418,038 B2 * | 7/2002 | Takahama et al. ............. | 363/17 |
| 6,487,092 B2 * | 11/2002 | Nishikawa .................... | 363/17 |
| 6,590,790 B2 * | 7/2003 | Hosotani et al. ......... | 363/21.16 |
| 7,110,268 B2 * | 9/2006 | Yasumura ................ | 363/21.03 |
| 7,339,799 B2 * | 3/2008 | Osaka et al. .................. | 363/17 |
| 7,522,430 B2 * | 4/2009 | Osaka ...................... | 363/21.02 |
| 7,525,822 B2 * | 4/2009 | Aso et al. ................ | 363/21.06 |

* cited by examiner

*Primary Examiner*—Gary L Laxton
*Assistant Examiner*—Yemane Mehari
(74) *Attorney, Agent, or Firm*—Sidley Austin LLP

(57) ABSTRACT

In one embodiment, a power converter generates an output voltage by modulating an input voltage according to operations of a first switch and a second switch connected in a half-bridge arrangement. The power converter includes a switch driver circuit for controlling the turning on and off of the first and second switches. A PWM controller generates a switch driver control signal for controlling the switch driver circuit according to an output voltage. The switch driver circuit generates an on-time control signal for turning off the first switch when the first switch has been turned on for longer than a threshold period.

15 Claims, 3 Drawing Sheets

HALF-BRIDGE POWER CONVERTER SYSTEM AND METHOD OF OPERATION

CROSS-REFERENCE TO RELATED APPLICATION

This application claims priority to and the benefit of Korean Patent Application No. 10-2006-0043765 filed in the Korean Intellectual Property Office on May 16, 2006, the entire content of which is incorporated herein by reference.

BACKGROUND OF THE INVENTION

1. Field of the Invention

The present invention relates to power converters, and more particularly, a half-bridge power converter system and a method of operation.

2. Description of the Related Art

A bridge power converter is an insulation-type converter and is commonly used in a middle-sized to large-sized power module. A bridge power converter can be classified as a half-bridge power converter or a full-bridge power converter depending on the number of switches and the location of the switches.

A conventional half-bridge converter includes a high voltage or high-side switch, which is turned on and off according to a pulse width modulation (PWM)-based control method. However, when the high-side switch is turned on for a relatively long period of time, several problems may occur. For instance, when a half-bridge converter is used in a resonance-type power converter, the resonant capacitor may be fully discharged and/or the transformer of the converter may go into saturation. In addition, power is consumed in the high-side switch (which is inefficient) and the switch may be damaged.

SUMMARY OF THE INVENTION

In one aspect of the present invention, a half-bridge power converter system includes a switch driver circuit and a pulse width modulation (PWM) controller. The half-bridge converter generates an output voltage by modulating an input voltage according to operations of a first switch and a second switch coupled in a half-bridge arrangement. The switch driver circuit controls turning on/off of the first and second switches. The PWM controller generates a switch driver control signal for controlling the switch driver circuit according to the output voltage. If the first switch has been turned on for longer than a threshold period, the switch driver circuit generates a control signal for turning off the first switch.

In another aspect of the present invention, a switch driving apparatus is provided for controlling the turning on and off of a first switch and a second switch in a half-bridge power converter. The switch driving apparatus includes an input terminal for receiving an input control signal. A first dead-time controller provides a first control signal to keep the first switch turned off for a first dead-time period after the input control signal transitions from a first level to a second level. A second dead-time controller provides a second control signal to keep the second switch turned off for a second dead-time period after the input control signal transitions from the second level to the first level. An on-time controller provides an on-time control signal for turning off the first switch if the first switch has been turned on for longer than a threshold period.

In yet another aspect of the present invention, a method is provided for driving a power converter system that modulates an input voltage by using operations of a first switch and a second switch connected in a half-bridge arrangement. The method includes: generating a first switch control signal and a second switch control signal for respectively controlling the first switch and the second switch; generating an on-time control signal when the first switch control signal is maintained at a first level for longer than a first period; and performing a logic operation on the on-time control signal and the first switch control signal and generating a first switch off signal according to a result of the logic operation.

DETAILED DESCRIPTION OF THE EMBODIMENTS

Figure 1:
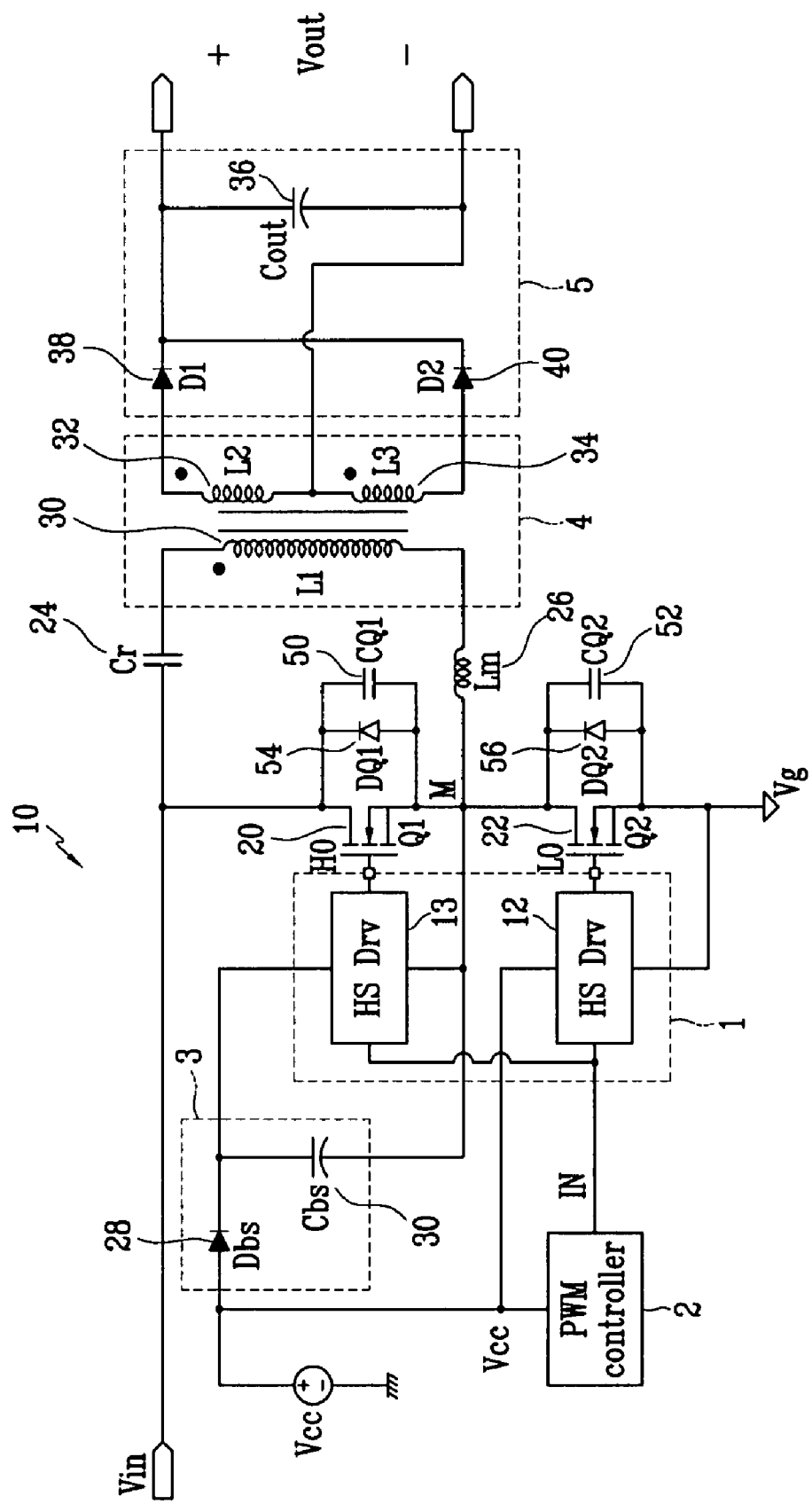
FIG. 1 is a schematic diagram of an exemplary implementation for a half-bridge power converter system, according to an embodiment of the present invention.
Figure 2:
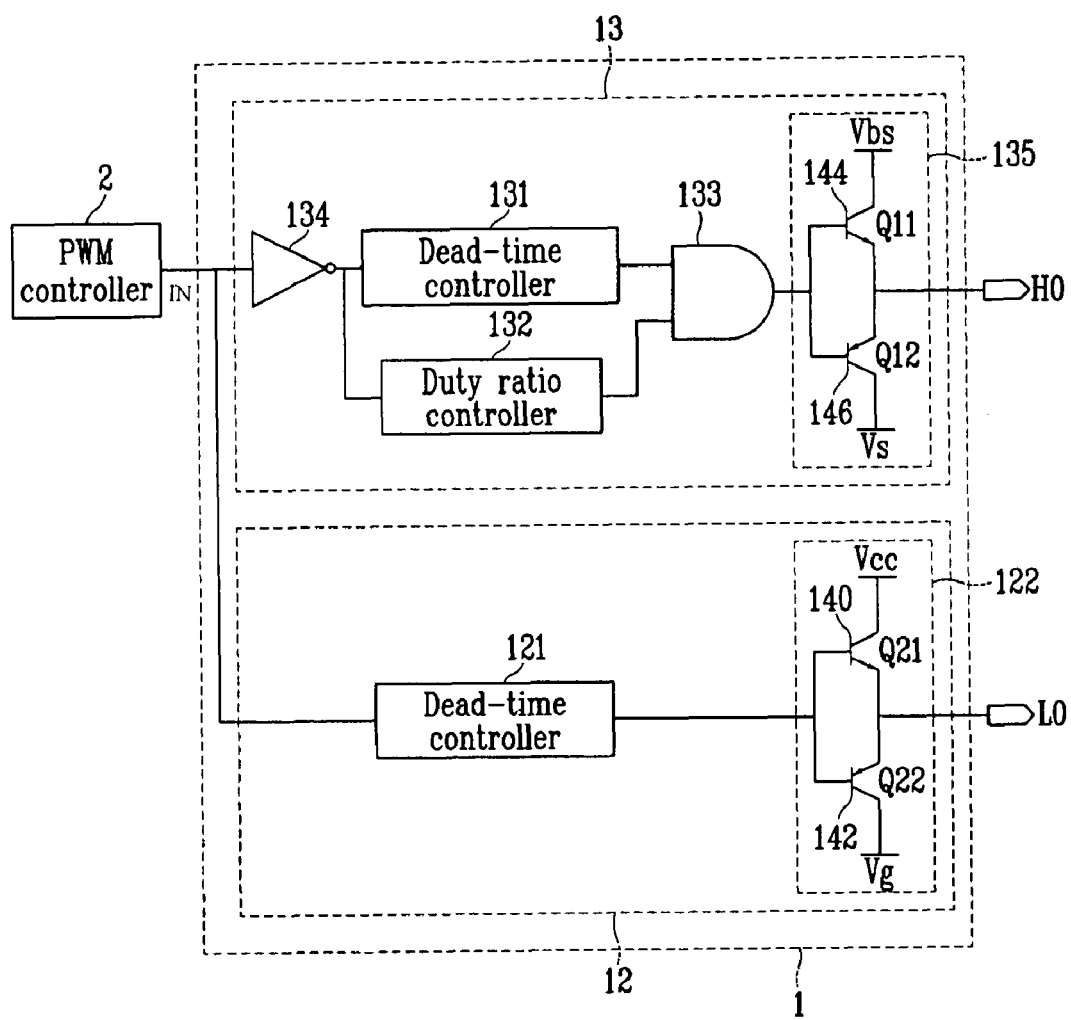
FIG. 2 is a schematic diagram of an exemplary implementation for a switch driver block, according to an embodiment of the present invention.
Figure 3:
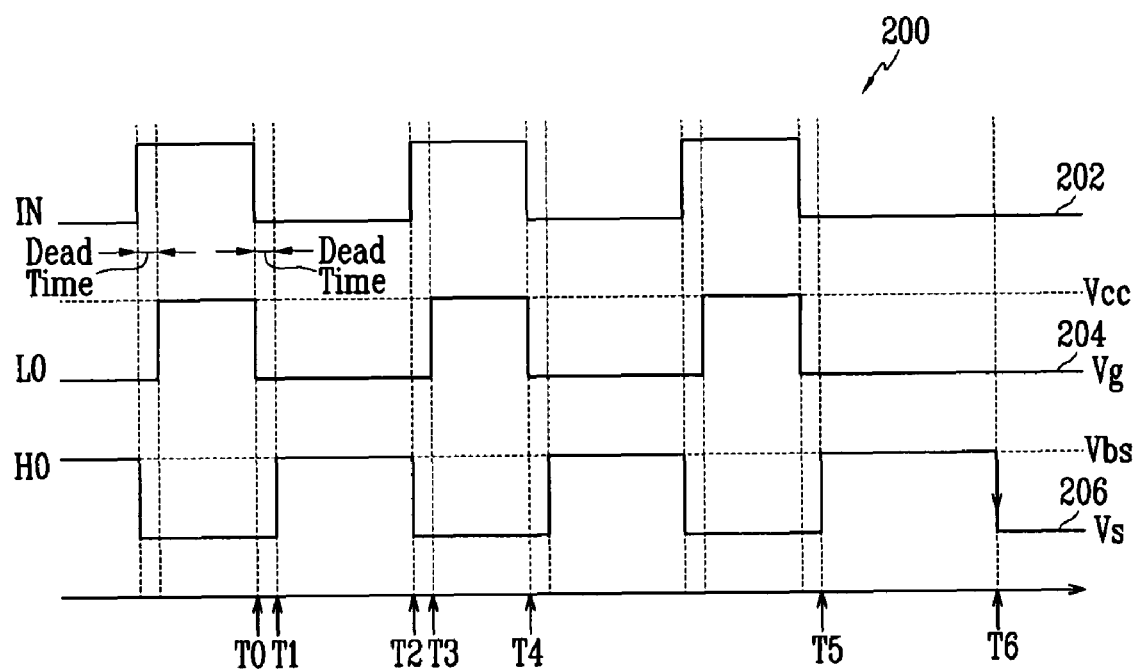
FIG. 3 is a waveform diagram illustrating an exemplary operation for a half-bridge power converter system, according to an embodiment of the present invention.

Embodiments of the present invention and their advantages are best understood by referring to FIGS. 1 through 3 of the drawings. In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, when an element is described as coupled to another element, the element may be directly coupled to the other element or electrically coupled to the other element through one or more other elements.

According to some embodiments of the invention, a half-bridge power converter system and a driving method thereof prevent power consumption when a switch is maintained in the turn-on state for a relatively long or excessive period of time.

FIG. 1 is a schematic diagram of an exemplary implementation for a half-bridge power converter system 10, according to an embodiment of the present invention. As shown in FIG. 1, the half-bridge power converter system 10 includes a switch driver block 1, a pulse width modulation (PWM) controller block 2, a bootstrap block 3, a high voltage or high-side switch (Q1) 20, a low voltage or low-side switch (Q2) 22, a resonant capacitor (Cr) 24, an inductor (Lm) 26, a transformer 4, and an output block 5 (at which an output voltage Vout is provided). In one embodiment, as shown, the high-side switch 20 and the low-side switch 22 of the exemplary can be implemented as N-type metal-oxide-semiconductor field effect transistors (MOSFETs), each having a gate (or control) electrode, a drain electrode, and a source electrode.

The switch driver block 1 may provide control signal to turn on and off the high-side switch 20 and the low-side switch 22 according to one or more switching control signals from the PWM controller block 2. The PWM controller block 2 generates the one or more control signal (hereinafter referred to as a "switching control signal IN") for controlling the high-side switch 20 and the low-side switch 22, thereby controlling the level of the output voltage Vout provided at the output block 5.

The bootstrap block 3 can include a bootstrap diode (Dbs) 28 and a bootstrap capacitor (Cbs) 30. The bootstrap diode 28 is biased in a forward direction from a power source Vcc to the bootstrap capacitor 30, which thus charges the bootstrap capacitor 30 to a predetermined voltage level. The charged voltage is provided to the switch driver block 1, and is then used for controlling the high-side switch 20.

The transformer 4 may include a primary coil (L1) 30, a secondary coil (L2) 32, and a third coil (L3) 34. The primary coil 30, in a primary side of the transformer 4, can be coupled to the resonant capacitor 24 and the inductor 26. The secondary coil 32 and the third coil 34, in a secondary side of the transformer 4, are coupled to an output capacitor (Cout) 36 of the output block 5. The transformer 4 supplies power to the secondary side by using an input voltage transmitted to the primary side according to a duty ratio of the high-side switch 20.

The output block 5 includes a first diode (D1) 38, a second diode (D2) 40, and the output capacitor 36. The first diode 38 and the second diode 40 control or direct the flow of current from the secondary coil 32 or the third coil 34 to the output capacitor 36. The first and second diodes 38 and 40 in the output block 5 direct or control current flow inducted to the secondary side of the transformer 4. The output capacitor 36 may eliminate ripple from the output voltage Vout, and is charged by the current delivered through the first diode 38 and second diode 40. When the first diode 38 and the second diode 40 are open, the output capacitor 36 supplies or provides the output voltage Vout to a load coupled to the output terminal of the system 10.

The high-side switch 20 and the low-side switch 22 are coupled together at a node M in a half-bridge arrangement. The high-side switch 20 may be coupled to the primary side of the transformer 4. The drain electrode of the high-side switch 20 receives the input voltage Vin. The gate electrode of the high-side switch 20 is coupled to the switch driver block 1. The source electrode of the high-side switch 20 is coupled to the drain electrode of the low-side switch 22 at the node M. The gate electrode of the low-side switch 22 is coupled to the switch driver block 1. The source electrode of the low-side switch 22 is coupled to a ground voltage Vg. The high-side switch 20 and the low-side switch 22 include parasitic capacitors (CQ1) 50 and (CQ2) 52 and parasitic diodes (DQ1) 54 and (DQ2) 56.

The switch driver block I provides control signals HO and LO for turning on and off the high-side and low-side switches 20, 22. As depicted, switch driver block I includes a high-side switch controller 13 (which outputs the control signal HO) and a low-side switch controller 12 (which outputs the control signal LO). An exemplary implementation of the switch driver block 1, according to an embodiment of the present invention, is described in further detail with reference to FIG. 2.

FIG. 2 is a schematic diagram of an exemplary implementation for switch driver block 1, according to an embodiment of the present invention. As shown in FIG. 2, the switch driver block I includes low-side switch controller 12 and high-side switch controller 13. Each of the high-side switch controller 13 and the low-side switch controller 12 receives the switching control signal IN from the PWM controller 2.

Low-side switch controller 12 outputs the control signal LO for controlling the low-side switch 22. The low-side switch controller 12 may include a first dead-time controller 121 and a driver or level shifter circuit 122.

The dead-time controller 121 of the low-side switch controller 12 receives the switching control signal IN (from PWM controller block 2). The dead-time controller 121 detects a change of the level of the switching control signal IN from low to high, and in response provides a value for the control signal LO to maintain or turn off the low-side switch 22 for some period of time so as to create a "dead time" during which both switches of the half-bridge are turned off. In one embodiment, the dead-time controller 121 provides a low level output to the level shifter circuit 122 during the dead-time period. The implementation of dead-time controller 121 would be understood to one of ordinary skill in the art based on its description herein.

The level shifter circuit 122 may include an N-type channel transistor (Q21) 140 and a P-type channel transistor (Q22) 142. In one embodiment, as shown, the N-type channel transistor 140 and the P-type channel transistor 142 are respectively an N-type bipolar junction transistor (BJT) and a P-type BJT. The level shifter circuit 122 outputs the control signal LO, which may have a value of either Vcc or Vg depending on the control signal from the dead-time controller 121. When a level of the control signal from dead-time controller 121 is high, transistor 140 is turned on and transistor 142 is turned off, and thus the level shifter circuit 122 outputs a value of Vcc for the control signal LO, which turns on the low-side switch 22. When the level of the control signal from dead-time controller 121 is low, transistor 140 is turned off and transistor 142 is turned on, and thus the level shifter circuit 122 outputs a value of Vg or ground for the control signal LO, which turns off the low-side switch 22.

High-side switch controller 13 outputs the control signal HO for controlling the high-side switch 20. The high-side switch controller 13 may include a dead-time controller 131, a duty ratio controller 132, an AND gate 133, an inverter 134, and a driver of level shifter circuit 135.

The inverter 134 inverts the switching control signal IN and provides the inverted control signal to the dead-time controller 131 and the duty ratio controller 132. The dead-time controller 131, which receives the inverted control signal, detects a change of level of the inverted switching control signal from low to high (which corresponds to a change in the level of the (non-inverted) switching control signal IN from high to low). In response, the dead time controller 131 provides a value to maintain or turn off the high-side switch 20 for some period of time so as to create a "dead time" during which both switches of the half-bridge are turned off. In one embodiment, the dead-time controller 131 provides a low level output to the AND gate 133 during the dead-time period. The implementation of dead-time controller 131 would be understood to one of ordinary skill in the art based on its description herein.

The duty ratio controller 132 receives the inverted switching control signal from the inverter 134. Duty ratio controller 132 implements or provides a timer which determines or keeps track of how long the high-side switch 20 has been turned on. If the high-side switch 20 has been turned on for longer than a predetermined period (hereinafter referred to as a "threshold period"), the duty ratio controller 132 generates a control signal to cause the high-side switch 20 to be turned off. In one embodiment, the duty ratio controller 132 outputs a high level output signal to the AND gate 133 until it determines that the on time for high-side switch 20 has exceeded the threshold period. When the on time for high-side switch 20 has exceeded the threshold period, duty ratio controller 132 provides a low level output to the AND gate 133, which causes the high-side switch 20 to be turned off. In some embodiments, the threshold period may be the same as a duty ratio of the switching control signal, but the invention is not so limited. The threshold period may be set to prevent damage to the high-side switch 20, to prevent the resonant capacitor 24 from being fully discharged, or to prevent the saturation of the transformer 4. The implementation of the duty ratio controller 132 would be understood to one of ordinary skill in the art based on its description herein.

The AND gate 133 performs an AND operation on the control signals from the dead-time controller 131 and the duty ratio controller 132. The AND gate 133 generates an output control signal according to the operation result. The output control signal from the AND gate is provided to the first level shifter circuit 135.

The level shifter circuit 135 may includes an N-type channel transistor (Q11) 144 and a P-type channel transistor (Q 12) 146. In one embodiment, as shown, the N-type channel transistor 144 and the P-type channel transistor 146 are respectively an N-type BJT and a P-type BJT. The level shifter circuit 135 outputs the control signal HO, which may have a value of either Vbs or Vs depending on the switch control signal IN. When a level of the output control signal from the AND gate 133 is high, transistor 144 is turned on and transistor 146 is turned off, and thus the level shifter circuit 135 outputs a value of Vbs for the control signal HO, which turns on the high-side switch 20. When the level of the control signal from AND gate 133 is low, transistor 144 is turned off and transistor 146 is turned on, and thus the level shifter circuit 135 outputs a value of Vs for the control signal HO, which turns off the low-side switch 22.

A voltage level of Vcc for the control signal LO and a voltage level of Vbs for the control signal HO, respectively, turn on the low-side switch 22 and the high-side switch 20. A voltage level of Vg for the control signal LO and a voltage level of Vs for the control signal HO, respectively, turn off the low-side switch 22 and the high-side switch 20.

An exemplary method of operating the half-bridge power converter system 10 according to an embodiment of the present invention will now be described in further detail with reference to FIG. 3.

FIG. 3 is a waveform diagram 200 illustrating an exemplary operation for half-bridge power converter system 10, according to an embodiment of the present invention. Waveform diagram 200 includes exemplary waveforms 202, 204, and 206. Waveform 202 represent the switching control signal IN output from PWM controller 2. Waveforms 204 and 206 represent the high-side switch control signal HO and the low-side switch control signal LO, respectively output from the high-side switch controller 13 and the low-side switch controller 12 of the switch driver circuit 1.

At a time T0, dead-time controller 131 in the high-side switch controller 13 detects a change in the level of the switching control signal IN from high to low. In response, dead-time controller 131 provides a control signal to keep high-side switch 20 turned off for some period of time—i.e., from time T0 to time T1. This period between T0 and T1 can be a dead-time period, during which both control signals HO and LO are low, thus turning off the high-side switch 20 and the low-side switch 22. During the dead-time period from T0 to T1, an inverted current flows through the high-side switch 20 due to its parasitic diode 54. While current flows through the parasitic diode 54, zero-voltage switching occurs, and the high-side switch 20 is turned on at time T1.

During the period from T1 to T2, the high-side switch 20 is turned on and the low-side switch 22 is turned off. Resonant capacitor 24 and inductor 26 generate a resonance such that a resonant current flows in one direction in primary coil 30 of the transformer 4. This causes current flow in the third coil 34 of the transformer 4. The diode 40 in the output circuit 5 is turned on and current flows in a forward direction from the third coil 34 of the transformer 4 to charge the output capacitor 36, thereby increasing the output voltage Vout. The resonant current increases to a predetermined level with a sine wave line, and then decreases at time T2. At this time, the diode 38 is turned off.

At a time T2, dead-time controller 121 in the low-side switch controller 12 detects a change in the level of the switching control signal IN from low to high. In response, dead-time controller 121 provides a control signal to keep low-side switch 22 turned off for some period of time—i.e., from time T2 to time T3. This period between T2 and T3 can be another dead-time period, during which both control signals HO and LO are low, thus turning off the high-side switch 20 and the low-side switch 22. During the dead-time period from T2 to T3, the resonant capacitor 24 and the inductor 26, by resonance, discharges the parasitic capacitor 52 of the low-side switch 22 through the parasitic diode 56. The output voltage Vout drops to near 0V at this time.

At time T3, the low-side switch 22 is turned on. Then, a voltage at the primary side of the transformer 4 becomes equal to the input voltage Vin, and a constant voltage is induced in the secondary side of the transformer 4. This causes current to flow from the secondary coil 32 through diode 38 of the output circuit 5. At this time, the diode 40 is turned off.

During the period from T3 to T4, the low-side switch 22 is turned on and the high-side switch 20 is turned off. Current flows through the primary coil 30 of the transformer 4 to the ground voltage Vg through the low-side switch 22. Current flows from the secondary coil 32 of transformer 4 through the diode 38 to charge capacitor 36. After a predetermined time has passed, current ceases to flow through the primary coil 30 of the transformer 4. Then, no current is generated in the secondary side of the transformer 4 so that the diodes 38 and 40 are both turned off. At this time, the output capacitor 36 discharges so that current flows to a load coupled to the output terminal, thereby supplying power.

By repeating the above process, the half-bridge power converter system 10 converts the input voltage Vin into an output voltage Vout of a predetermined level to supply power to the load.

However, if during operation of system 10 the high-side switch 20 is turned on for a relatively long or excessive period of time, embodiments of the present invention function to turn off the high-side switch 20 to prevent power consumption and possible damage to the switch.

For example, referring to FIG. 3, such a relatively long or excessive period of time for the high-side switch 20 to be turned on may be the period from time T5 to time T6. If this occurs, the duty ratio controller 132 determines that the high-side switch 20 has been turned on for longer than the threshold period. The duty ratio controller 132 then outputs a control signal for turning off the switch 20. In one embodiment, for example, the duty ratio controller provides a low level output signal to the AND gate 133. The AND gate 133 receives the low level signal, and provides a low level output control signal to the first level shifter circuit 135, according to the AND operation. In turn, the first level shifter circuit 135 outputs a low level voltage Vs for the high-side control HO, which turns off the high-side switch 20.

As described, embodiments of the invention prevent the high-side switch 20 in half-bridge power converter system from being turned on for a relatively long or excessive periods of time. Thus, the half-bridge converter can operate under stable conditions. In addition, by keeping track of and responding to the turn-on time of the high-side switch, embodiments of the present invention prevent the full discharge of a resonant capacitor in the half-bridge converter, saturation of a transformer, and power consumption in the high-side switch.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A power converter system, comprising:
   a high-side switch and a low-side switch connected in a half-bridge arrangement;
   a switch driver circuit for controlling the turn-on and turn-off of the high-side switch and the low-side switch in the half-bridge arrangement; and
   a pulse width modulation (PWM) controller for generating a switch driver control signal for controlling the switch driver circuit according to an output voltage, wherein the output voltage is generated by modulating an input voltage according to operations of the high-side switch and the low-side switch; and
   the switch driver circuit detects the switch driver control signal, generates an on-time control signal when the switch driver control signal turns on the high-side switch for longer than a threshold period, the on-time control signal for turning off the high-side switch, the switch driver circuit comprising:
      a first dead-time controller for controlling a dead time of the high-side switch;
      a second dead-time controller for controlling a dead time of the low-side switch;
      an on-time controller for determining whether the high-side switch turns on during the threshold period, and generating the on-time control signal; and
      a logic operation unit for performing a logic operation on a first dead-time control signal output from the first dead-time controller and the on-time control signal, the logic operation unit generating the on-time control signal for turning off the high-side switch.

2. The power converter system of claim 1, wherein the switch driver circuit further comprises:
   an inverter for inverting the switch driver control signal and outputting an inverted switch driver control signal; and
   wherein the on-time controller receives the inverted switch driver control signal, determines whether the inverted switch driver control signal turns on the high-side switch during the threshold period, and generates the on-time control signal.

3. The power converter system of claim 1, wherein the high-side switch is an N-type channel transistor.

4. The power converter system of claim 2, wherein the first dead-time controller provides a signal for keeping the high-side switch turned off when the switch driver control signal transitions from a first level to a second level, and wherein the second dead-time controller provides a signal for keeping the low-side switch turned off when the switch driver control signal transitions from the second level to the first level.

5. The power converter system of claim 2, wherein the logic operation is an AND operation, and wherein the on-time control signal is a result of the AND operation.

6. A switch driving apparatus for controlling the turning on and off of a high-side switch and a low-side switch in a half-bridge power converter, the switch driving apparatus comprising:
   an input terminal for receiving an input control signal;
   a first dead-time controller for providing a first control signal to keep the high-side switch turned off for a first dead-time period after the input control signal transitions from a first level to a second level;
   a second dead-time controller for providing a second control signal to keep the low-side switch turned off for a second dead-time period after the input control signal transitions from the second level to the first level; and
   an on-time controller for providing an on-time control signal for turning off the high-side switch if the high-side switch has been turned on for longer than a threshold period.

7. The switch driving apparatus of claim 6, wherein the input control signal is provided from a PWM controller.

8. The switch driving apparatus of claim 6, wherein the on-time controller determines whether the input control signal has been maintained at a first level for longer than the threshold period.

9. The switch driving apparatus of claim 6, comprising a logic operation unit for performing a logic operation on the first control signal output from the first dead-time controller and the on-time control signal.

10. The switch driving apparatus of claim 6, comprising a level shifter circuit for receiving the second control signal from the second dead-time controller, and for shifting a level of the second control signal.

11. The switch driving apparatus of claim 9, comprising a level shifter circuit for receiving an output signal from the logic operation unit, and for shifting a level of the output signal.

12. A method for driving a power converter system that modulates an input voltage by using operations of a high-side switch and a low-side switch connected in a half-bridge arrangement, the method comprising:
   generating a first switch control signal and a second switch control signal for respectively controlling the high-side switch and the low-side switch;
   generating an on-time control signal when the first switch control signal is maintained at a first level for longer than a first period; and
   performing a logic operation on the on-time control signal and the first switch control signal and generating a high-side switch off signal for turning off the high-side switch according to a result of the logic operation.

13. The method of claim 12, further comprising maintaining the first switch control signal at a second level for a second period when the first switch control signal is changed to the first level from the second level.

14. The method of claim 13, wherein the high-side switch is an N-type channel transistor, the first and second levels respectively correspond to high and low levels, and the on-time control signal corresponds to a low level.

15. The method of claim 14, wherein the logic operation performed on the on-time control signal and the first switch control signal is an AND operation.

* * * * *